(12) United States Patent
Sinclair et al.

(10) Patent No.: US 9,793,984 B2
(45) Date of Patent: Oct. 17, 2017

(54) COHERENT RECEIVER BASED VIRTUAL OPTICAL SPECTRUM ANALYZER

(71) Applicant: Ciena Corporation, Hanover, MD (US)

(72) Inventors: Andrew Sinclair, Kanata (CA); Eric Maniloff, Stittsville (CA)

(73) Assignee: Ciena Corporation, Hanover, MD (US)

(*) Notice: Subject to any disclaimer, the term of this patent is extended or adjusted under 35 U.S.C. 154(b) by 94 days.

(21) Appl. No.: 15/001,335

(22) Filed: Jan. 20, 2016

(65) Prior Publication Data

US 2017/0207849 A1 Jul. 20, 2017

(51) Int. Cl.
H04B 10/61 (2013.01)
H04B 10/079 (2013.01)
H04J 14/02 (2006.01)
H04B 10/572 (2013.01)

(52) U.S. Cl.
CPC ....... *H04B 10/0795* (2013.01); *H04B 10/572* (2013.01); *H04B 10/61* (2013.01); *H04J 14/02* (2013.01)

(58) Field of Classification Search
CPC ............ H04B 10/07955; H04B 10/077; H04B 10/00; H04B 10/0795; H04B 10/61; H04B 10/572; H04J 14/0221; H04J 14/0227; H04J 14/02
See application file for complete search history.

(56) References Cited

U.S. PATENT DOCUMENTS

| 7,769,305 | B1 | 8/2010 | Roberts et al. |
|---|---|---|---|
| 7,899,340 | B1 | 3/2011 | Bontu et al. |
| 8,463,133 | B1 | 6/2013 | Roberts et al. |
| 8,929,749 | B2 | 1/2015 | Roberts et al. |
| 9,225,430 | B2 | 12/2015 | Harley et al. |
| 2002/0130255 | A1* | 9/2002 | Baney .......... H04B 10/07 250/227.19 |
| 2004/0208432 | A1 | 10/2004 | Mak et al. |
| 2014/0341595 | A1* | 11/2014 | Harley ........... H04B 10/616 398/208 |
| 2016/0277118 | A1* | 9/2016 | Chatelain ........ H04B 10/508 |

OTHER PUBLICATIONS

Seb J. Savory, Digital filters for coherent optical receivers, Jan. 21, 2008 / vol. 16, No. 2 / Optics Express 804.
Han Sun et al, Real-time measurements of a 40 Gb/s coherent system, Jan. 21, 2008 / vol. 16, No. 2 / Optics Express 873.
Recommendation ITU-T G.694.1, Spectral grids for WDM applications: DWDM frequency grid, Feb. 2012.

* cited by examiner

*Primary Examiner* — Ted Wang
(74) *Attorney, Agent, or Firm* — Clements Bernard Walker PLLC; Christopher L. Bernard; Lawrence A. Baratta, Jr.

(57) ABSTRACT

A coherent receiver adapted to operate as an Optical Spectrum Analyzer (OSA) includes an optical front end adapted to receive an optical signal and to mix the optical signal with a local laser; a photodetector block coupled to the optical front end and adapted to receive an output of the optical front end and provide an output corresponding to spectral components of the optical signal; and a controller coupled to the optical front end and the photodetector block, wherein the controller is adapted to operate in an OSA mode to sweep the local laser across a portion of optical spectrum to perform an OSA measurement while not performing data demodulation.

17 Claims, 5 Drawing Sheets

COHERENT RECEIVER BASED VIRTUAL OPTICAL SPECTRUM ANALYZER

FIELD OF THE DISCLOSURE

The present disclosure generally relates to optical networking systems and methods. More particularly, the present disclosure relates to a coherent receiver based virtual Optical Spectrum Analyzer (OSA).

BACKGROUND OF THE DISCLOSURE

An Optical Spectrum Analyzer (OSA) is configured to measure optical power as a function of wavelength. That is, an output of an OSA is a graph of optical power versus wavelength. With respect to optical networking, an OSA can be used on an optical fiber to determine the channels present, to measure channel drift, detect spectral gaps, equalize channel powers, determine the quality of transmitters/modems, determine signal characteristics, etc. In fixed grid optical networks, wavelengths are spaced apart from each other, or in other words, according to a grid defined by International Telecommunication Union (ITU) in ITU-T G.694.1 (February 2012), "Spectral grids for WDM applications: DWDM frequency grid," the contents of which are incorporated by reference. In flexible grid optical networks, which is also described in ITU Recommendation G.694.1 "Spectral grids for WDM applications: DWDM frequency grid" (February 2012), each signal can be allocated to spectrum with different widths optimized for the bandwidth requirements of the particular bit rate and modulation scheme of the individual channels. With the advent of flexible grid spacing, OSA measurements could be used to optimize spectrum usage and the like. In general, OSA measurements are useful to provide information not readily available related to actual performance over optical fibers.

Conventionally, optical networks and specifically transceivers or optical modems require an external OSA device for spectral measurements. Disadvantageously, external OSAs require test equipment and operators to physically perform the tests, relocate the test equipment, etc. This is expensive and time-consuming. Alternatively, high-resolution Optical Power Monitors (OPMs) have been proposed that may allow for spectral analysis, but this is still external from a specific transmitter and receiver and an expensive alternative. Conventional OPMs would not provide enough resolution for accurate analysis. Further, relying on the line OPMs to provide the OSA measurements requires the line system to be able to share this information with the modem or transceiver, which is only likely in a homogenous vendor installation which is not always possible; particularly in heterogeneous network deployments.

BRIEF SUMMARY OF THE DISCLOSURE

In an exemplary embodiment, a coherent receiver adapted to operate as an Optical Spectrum Analyzer (OSA) includes an optical front end adapted to receive an optical signal and to mix the optical signal with a local laser; a photodetector block coupled to the optical front end and adapted to receive an output of the optical front end and provide an output corresponding to spectral components of the optical signal; and a controller coupled to the optical front end and the photodetector block, wherein the controller is adapted to operate in an OSA mode to sweep the local laser across a portion of optical spectrum to perform an OSA measurement while not performing data demodulation. The coherent receiver can further include a Digital Signal Processor (DSP) adapted to perform digital signal processing techniques to recover an original digital signal from the optical signal while performing data demodulation. The controller can be adapted to utilize the OSA measurement to detect automatically existing optical channels to determine available spectrum for use and to cause a corresponding coherent transmitter to use a specific wavelength or spectrum based on the available spectrum. The controller can be adapted to utilize the OSA measurement to determine wavelength drift of optical channels in the optical signal. The controller can be adapted to utilize the OSA measurement to determine one or more of a modulation format and baud rate for a corresponding coherent transmitter. The controller can be adapted to provide the OSA measurement to one or more of a control plane and an external server including any of a Software Defined Networking (SDN) controller, a Network Management System (NMS), and an Element Management System (EMS). The optical signal can include a Wavelength Division Multiplex (WDM) signal with one or more of fixed grid channels and flexible grid channels, provided to the coherent receiver through one of a filtered implementation or filterless implementation. The coherent receiver can perform the OSA measurement in-skin without external test equipment.

In another exemplary embodiment, a coherent receiver operation method to perform Optical Spectrum Analysis (OSA) includes receiving an optical signal; mixing the optical signal with a local laser while sweeping the local laser across a portion of optical spectrum to perform an OSA measurement while not performing data demodulation; and detecting via a photodetector block an output of the mixing to determine corresponding to spectral components of the optical signal. The method can further include performing digital signal processing techniques to recover an original digital signal from the optical signal while performing data demodulation. The method can further include utilizing the OSA measurement to detect automatically existing optical channels to determine available spectrum for use; and causing a corresponding coherent transmitter to use a specific wavelength or spectrum based on the available spectrum. The method can further include utilizing the OSA measurement to determine wavelength drift of optical channels in the optical signal. The method can further include utilizing the OSA measurement to determine one or more of a modulation format and baud rate for a corresponding coherent transmitter. The method can further include providing the OSA measurement to one or more of a control plane and an external server including any of a Software Defined Networking (SDN) controller, a Network Management System (NMS), and an Element Management System (EMS). The optical signal can include a Wavelength Division Multiplex (WDM) signal with one or more of fixed grid channels and flexible grid channels, provided to the coherent receiver through one of a filtered implementation or filterless implementation. The method can further include performing the OSA measurement in-skin without external test equipment.

In a further exemplary embodiment, a controller in a coherent receiver adapted to operate the coherent receiver as an Optical Spectrum Analyzer (OSA) includes a processor; and memory storing instructions that, when executed, cause the processor to cause a local laser in the coherent receiver to sweep across a portion of optical spectrum to perform an OSA measurement while the coherent receiver is not performing data demodulation, and receive an output from photodetector block in the coherent receiver and determining spectral components of an optical signal mixed with the local laser. The memory storing instructions that, when executed, can further cause the processor to lock the local laser to a predetermined center wavelength enabling recovery of an original digital signal from the optical signal while performing data demodulation. The memory storing instructions that, when executed, can further cause the processor to utilize the OSA measurement to automatically detect existing optical channels to determine available spectrum for use, and cause a corresponding coherent transmitter to use a specific wavelength or spectrum based on the available spectrum. The memory storing instructions that, when executed, can further cause the processor to provide the OSA measurement to an external server including any of a Software Defined Networking (SDN) controller, a Network Management System (NMS), and an Element Management System (EMS).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, a coherent receiver based virtual Optical Spectrum Analyzer (OSA) is described. Specifically, the coherent receiver is configured to operate as a "virtual" OSA because existing hardware is used to implement a process in an out-of-service receiver that is connected to an optical fiber to perform OSA measurements. By keeping a modem transmitter output blanked (off) (i.e., out-of-service) and sweeping a Local Oscillator (LO) (laser), a coherent optical receiver can be made to act as a coherent optical spectrum analyzer. Transmitter blanking can be accomplished either internally, or via an external attenuator, such as those included in WDM Multiplexers. Advantageously, the virtual OSA utilizes existing hardware in a coherent receiver and thus does not require an external OSA or a high-resolution OPM to obtain OSA measurements. Operating the coherent optical receiver in this mode as a virtual OSA allows the coherent optical receiver to auto-detect existing optical channels in a colorless/flexible grid application. Using this information, the coherent optical receiver can automatically find available spectral gaps for use and/or optimally set its tuned frequency to minimize its impact on existing traffic.

Exemplary Optical Network

Figure 1:
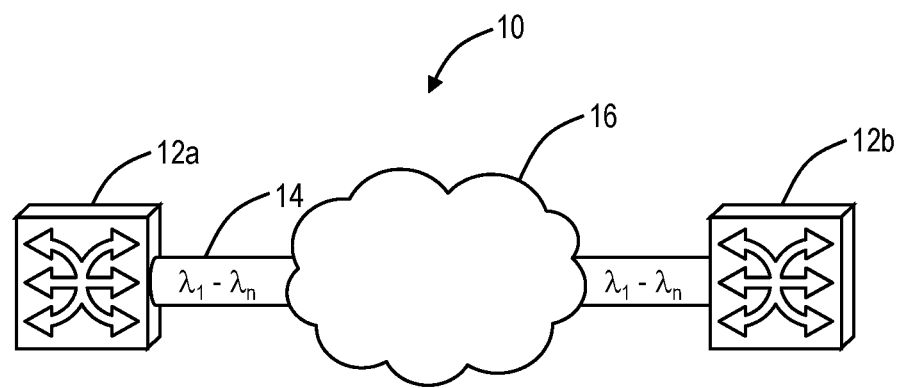
FIG. 1 is a network diagram of an exemplary network implementing a virtual OSA via coherent optical receivers.

Referring to FIG. 1, in an exemplary embodiment, a network diagram illustrates an exemplary network 10 implementing the virtual OSA via coherent optical receivers. The network 10 includes two interconnected network elements 12a, 12b via an optical link 14. Additionally, the optical link 14 can include additional components 16 which are omitted for illustration purposes. For example, the additional components 16 can include, without limitation, optical amplifiers, optical add/drop multiplexers (OADMs), reconfigurable OADMs (ROADMs), etc. In the context of the systems and methods, the network elements 12a, 12b are connected via the optical link 14 which is all-optical between the network elements 12a, 12b, i.e. no optical-electrical-optical (OEO) conversions between the network elements 12a, 12b. The optical link 14 can be a single span or multiple spans with intermediate amplifiers. Those of ordinary skill in the art will recognize that the network 10 can include other network elements 12a, 12b forming various architectures, i.e. mesh, rings, linear, spurs, etc. The network 10 is presented as a single optical link (optionally with the components 16) for an illustration of the systems and methods.

The optical link 14 can include N channels (or wavelengths), denoted as $\lambda_1$-$\lambda_n$. For example, the number N can be the maximum supported channels on the optical link 14. Additionally, the number N can be variable with respect to flexible grid channels (e.g., channels taking an arbitrary and variable amount of spectrum). For example, N can be 44 for 100 GHz channel spacing, 88 for 50 GHz channel spacing, or some other combination to deliver between varying number of wavelengths with flexible grid channels. Other embodiments are also contemplated.

Each of the channels can be formed by a transceiver, transponder, optical modem, etc. with either fixed grid or flexible grid spacing. For flexible grid spacing, variable capacity channels typically include adaptable coherent modulation or non-coherent modulation, adaptive FEC schemes, and spectral shaping. A flexible optical modem can support a variable amount of bandwidth, e.g., from x Gbps to y Gbps, where x<y. For example, a flexible optical modem can support a guaranteed rate, e.g. 40G, 100G, 400G, 1T, etc. along with a higher supported rate, e.g. 40G→100G, 100G→200G, 400G→1T, etc. The flexible optical modem utilizes the adaptable coherent modulation, adaptive FEC schemes, and spectral shaping to support the variable amount of bandwidth. An example of a flexible optical modem is WaveLogic from Ciena Corporation, the assignee of the present application/patent. Also, note the flexible optical modem may also be referred to as a transceiver, transponder, muxponder, etc., i.e., any optical device with a coherent optical receiver.

The virtual OSA contemplated operation via a coherent optical receiver in one of the network elements 12a, 12b, and the coherent optical receiver can be part of an optical modem. In general, an out-of-service coherent optical receiver at one of the network elements 12a, 12b can be used to perform OSA measurements on the optical fiber 14. The results of the OSA measurements can be used to determine spectral and operating characteristics of the optical fiber 14, to determine channels in-service and spectrum usage on the optical fiber 14, to determine an open wavelength or amount of spectrum to use, etc. In an exemplary embodiment, the virtual OSA can be used by the coherent optical receiver to assign a wavelength or amount of spectrum for a corresponding optical transmitter. That is, the coherent optical receiver can use the virtual OSA to determine the operating wavelength or spectrum automatically, without user involvement. Other embodiments are also contemplated.

Optical Modem

Figure 2:
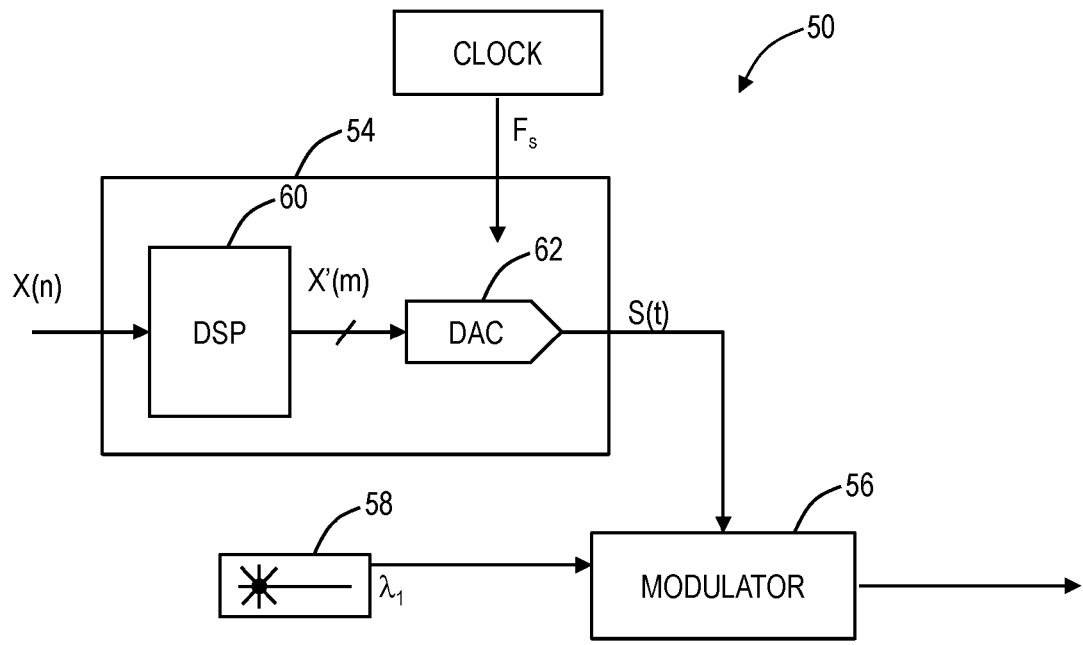
FIG. 2 is a block diagram of a coherent optical transmitter.
Figure 3:
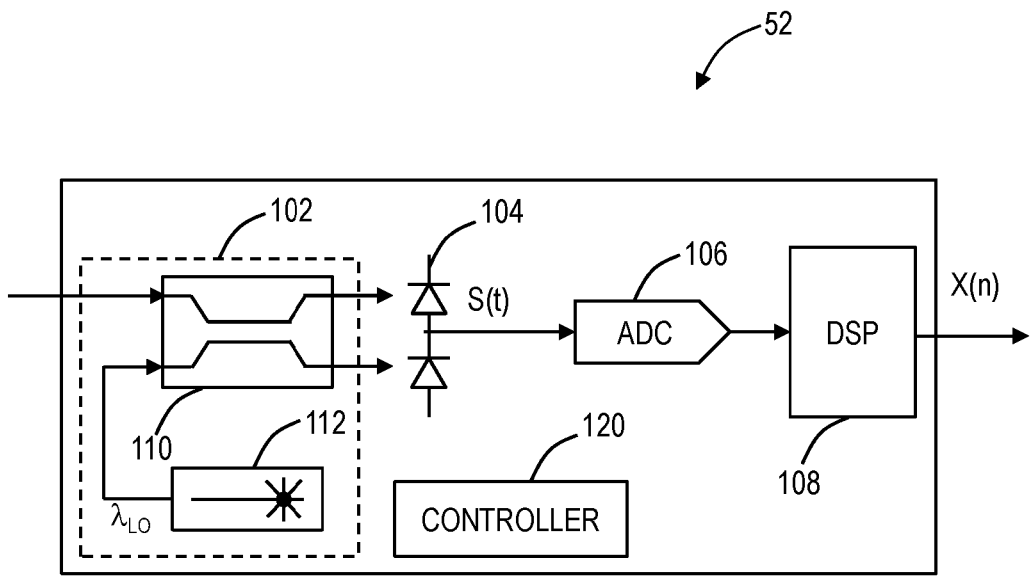
FIG. 3 is a block diagram of a coherent optical receiver, collectively the coherent optical transmitter of FIG. 2 and the coherent optical receiver can form an optical modem.

Referring to FIGS. 2 and 3, in an exemplary embodiment, block diagrams illustrate a coherent optical transmitter 50 and a coherent optical receiver 52 which collectively can form an optical modem. The coherent optical transmitter 50 and the coherent optical receiver 52 can be located at the network elements 12a, 12b to form a channel over the optical fiber 14. The coherent optical transmitter 50 typically includes a signal generator 54 for converting a digital signal X(n) to be transmitted into a drive signal S(t) which drives a modulator 56 (e.g., a Mach-Zehnder Modulator (MZM)). The modulator 56 modulates a narrow-band optical carrier, generated by a laser 58 tuned to a predetermined center wavelength $\lambda_1$ (among other center wavelengths $\lambda_2$ to $\lambda n$), to generate a corresponding optical channel signal. The resultant signal may then be multiplexed by a multiplexer (not shown) into a Wavelength Division Multiplexed (WDM) signal for transmission through the optical fiber 14 to the coherent optical receiver 52. Typically, the drive signal S(t) is a radio frequency (RF) analog electrical signal. In such cases, the signal generator 54 may include a Digital Signal Processor (DSP) 60 cascaded with a Digital-to-Analog Converter (DAC) 62. The DSP 60 operates to process the digital signal X(n) to generate a corresponding digital drive signal X'(m), which is designed in accordance with the performance and operating requirements of the DAC 62. The DAC 62 operates to convert the digital drive signal X'(m) into the required analog RF drive signal S(t) for modulation onto the optical carrier.

Once through the optical network 10 and the components 16, the optical channel signal is provided to the coherent optical receiver 52. Specifically, the coherent optical receiver 52 can operate in a filterless (or colorless) implementation where all of the WDM signal is present or in a filtered implementation where only a selected channel is present, e.g., wavelength $\lambda_1$. Also, the entire WDM signal (or portion thereof) can be presented to the coherent optical receiver 52 in a filtered implementation using a Wavelength Selective Switch (WSS) or the like. For illustration purposes, the filter components are omitted. In operation as a virtual OSA, the coherent optical receiver 52 would need access to the entire WDM signal (or portion thereof) for OSA measurements, and this can be provided in either a filterless implementation or filtered implementation using the components 16.

The coherent optical receiver 52 includes an optical front end 102 for supplying the optical channel signal to a photodetector block 104, which operates to detect the incoming optical channel signal and generate an electrical photodetector current containing spectral components corresponding to the high-speed signal S(t). The photodetector current is then sampled by an Analog-to-Digital Converter (ADC) 106 and processed by a corresponding DSP 108 in the coherent optical receiver 52 using various digital signal processing techniques to recover the original digital signal X(n). The optical front end 102 is provided by a mixer 110, which combines the incoming optical channel signal with a narrow-band light generated by a local laser 112 tuned to a specific center wavelength, $\lambda_{LO}$, of the optical channel signal. The local laser 112 can be referred to as a Local Oscillator (LO) and may include a tapped portion of the laser 58 from a corresponding optical transmitter 50 located in a same optical modem or a separate laser. This arrangement may be used to enable coherent detection of the optical channel signal. However, other arrangements, such as well-known direct detection techniques, may also be used. The coherent optical receiver 52 also includes a controller 120 communicatively coupled to various components for control thereof.

An optical modem formed by the coherent optical transmitter 50 and the coherent optical receiver 52 can support various different baud rates through software-programmable modulation formats. The modems can support programmable modulation or constellations with both varying phase and/or amplitude. In an exemplary embodiment, the optical modem can support multiple coherent modulation formats such as, for example, i) dual-channel, dual-polarization (DP) binary phase-shift keying (BPSK) for 100G at submarine distances, ii) DP quadrature phase-shift keying (QPSK) for 100G at ultra-long haul distances, iii) 16-quadrature amplitude modulation (QAM) for 200G at metro to regional (600 km) distances), or iv) dual-channel 16QAM for 400G at metro to regional distances. Thus, in an exemplary embodiment, the same modem can support 100G to 400G. With associated digital signal processing (DSP) in the modem hardware, moving from one modulation format to another is completely software-programmable. Other embodiments are also contemplated.

In another exemplary embodiment, the modem can support N-QAM modulation formats with and without dual-channel and dual-polarization where N can even be a real number and not necessarily an integer. Here, the modem can support non-standard speeds since N can be a real number as opposed to an integer, i.e. not just 100G, 200G, or 400G, but variable speeds, such as 130G, 270G, 560G, etc. Alternatively, the data rate can be varied by changing the baud rate, such that a given modulation format can carry different capacities based on the baud rate selected. These rates could be integer multiples of 10 Gb/s, or of 1 Gb/s. Furthermore, with the DSP and software programming, the capacity of the flexible optical modem can be adjusted upwards or downwards in a hitless manner so as not to affect the guaranteed rate. In other exemplary embodiments, the modem can include hardware which lacks the aforementioned functionality and thus supports a single modulation format/baud rate which cannot be adjusted (but other parameters can be adjusted such as power, spectrum location, etc.). Additionally, the modems can tune and arbitrarily select spectrum; thus no optical filters are required. Additionally, the modem can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate vs. noise tolerance.

In conventional operation, the local laser 112 is tuned to the predetermined center wavelength $\lambda_1$ of the coherent optical transmitter 52 to allow coherent detection of the optical channel signal. In the virtual OSA operation, the local laser 112 is swept, continuously or in discrete steps, across all or a portion of optical spectrum over the optical fiber 14 to perform coherent detection resulting in an in-skin OSA measurement. The controller 120 can be configured to cause the sweeping of the local laser 112 and the corresponding electrical photodetector current from the photodetector block 104 can be used to generate a spectral plot forming an OSA measurement.

In an exemplary embodiment, the coherent optical receiver 52 is adapted to operate as an Optical Spectrum Analyzer (OSA). The optical front end 102 is adapted to receive an optical signal and to mix the optical signal with the local laser 112. The photodetector block 104 is coupled to the optical front end 102 and adapted to receive an output of the optical front end 102 and provide an output corresponding to spectral components of the optical signal. The controller 120 is coupled to the optical front end 102 and the photodetector block 104, and the controller 120 is adapted to operate in an OSA mode to sweep the local laser 112 across a portion of the optical spectrum to perform an OSA measurement while not performing data demodulation. The coherent optical receiver 52 can further include the DSP 108 adapted to perform digital signal processing techniques to recover an original digital signal from the optical signal while performing data demodulation.

The controller 120 can be adapted to utilize the OSA measurement to detect automatically existing optical channels to determine available spectrum for use and to cause a corresponding coherent optical transmitter 50 to use a specific wavelength or spectrum based on the available spectrum. The controller 120 can be adapted to utilize the OSA measurement to determine wavelength drift of optical channels in the optical signal. The controller 120 can be adapted to utilize the OSA measurement to determine one or more of a modulation format and baud rate for a corresponding coherent optical transmitter 50. The controller 120 can be adapted to provide the OSA measurement to one or more of a control plane and an external server including any of a Software Defined Networking (SDN) controller, a Network Management System (NMS), and an Element Management System (EMS). The optical signal can include a Wavelength Division Multiplex (WDM) signal with one or more of fixed grid channels and flexible grid channels, provided to the coherent receiver through one of a filtered implementation or filterless implementation. The coherent optical receiver 52 performs the OSA measurement in-skin (i.e., internal to the coherent optical receiver 52) without external test equipment.

The coherent optical receiver 52, by taking advantage of the coherent receiver design, provides in-skin OSA functionality and external test equipment, and operators are no longer needed. Deployment is much easier and safer. Having the in-skin OSA ability allows the optical modem to operate more reliably on foreign line systems and allow for safer turn-up and/or restoration of wavelengths in flex grid systems supporting tuning optimization.

The ability for an optical modem to pre-determine if it is safe to turn up at the requested frequency can prevent costly outages and provide improved uptimes for operators. It could also reduce the load on system support/engineering teams as less on-site testing and measurement would be required. An optical modem could be shipped without fear of miscommunication from the customer causing an unexpected outage. This ability would also allow for easier deployment on foreign line systems were communication with the line system may be limited or non-existent. Accurate spectral information may also allow for even tighter squeezing of channels (i.e., Nyquist or super-Nyquist spacing) without restoration issues allowing for even higher spectral densities. By measuring the spectrum available, channels can optimize their modulation format, and tune both the line and channel capacities using Flexible Ethernet and Flexible Optical Transport Network (OTN).

Coherent Receiver Operation Method

Figure 4:
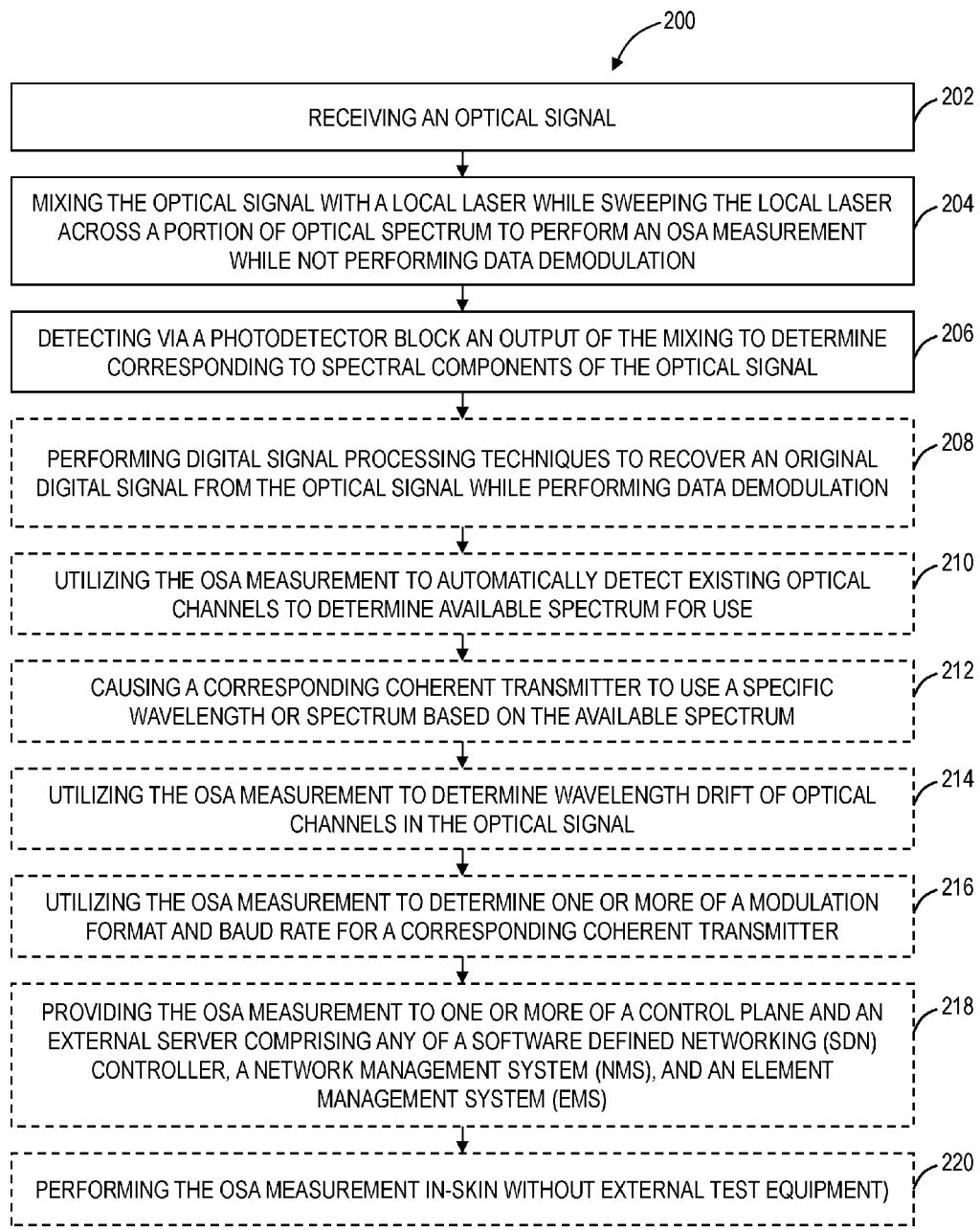
FIG. 4 is a flowchart illustrates a coherent receiver operation method to perform Optical Spectrum Analysis (OSA)

Referring to FIG. 4, in an exemplary embodiment, a flowchart illustrates a coherent receiver operation method 200 to perform Optical Spectrum Analysis (OSA). The coherent receiver operation method 200 includes receiving an optical signal (step 202); mixing the optical signal with a local laser while sweeping the local laser across a portion of optical spectrum to perform an OSA measurement while not performing data demodulation (step 204); and detecting via a photodetector block an output of the mixing to determine corresponding to spectral components of the optical signal (step 206).

The method 200 can further include performing digital signal processing techniques to recover an original digital signal from the optical signal while performing data demodulation (step 208). The method 200 can further include utilizing the OSA measurement to detect automatically existing optical channels to determine available spectrum for use (step 210); and causing a corresponding coherent transmitter to use a specific wavelength or spectrum based on the available spectrum (step 212). The method 200 can further include utilizing the OSA measurement to determine wavelength drift of optical channels in the optical signal (step 214). The method 200 can further include utilizing the OSA measurement to determine one or more of a modulation format and baud rate for a corresponding coherent transmitter (step 216). The method 200 can further include providing the OSA measurement to one or more of a control plane and an external server including any of a Software Defined Networking (SDN) controller, a Network Management System (NMS), and an Element Management System (EMS) (step 218).

The optical signal can include a Wavelength Division Multiplex (WDM) signal with one or more of fixed grid channels and flexible grid channels, provided to the coherent receiver through one of a filtered implementation or filterless implementation. The method 200 can further include performing the OSA measurement in-skin without external test equipment (step 220).

Exemplary OSA Measurements

Figure 5:
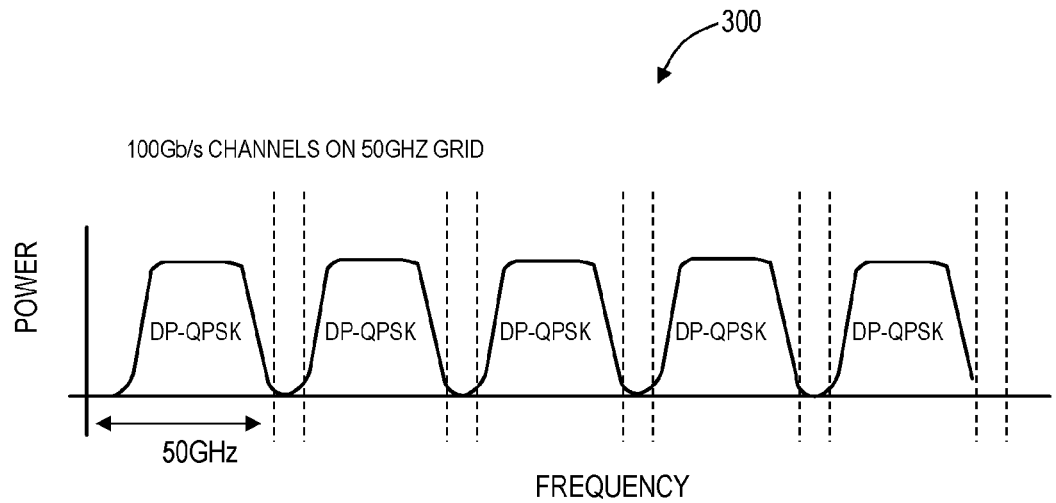
FIG. 5 is a spectrum plot of an OSA measurement for a fixed grid.
Figure 6:
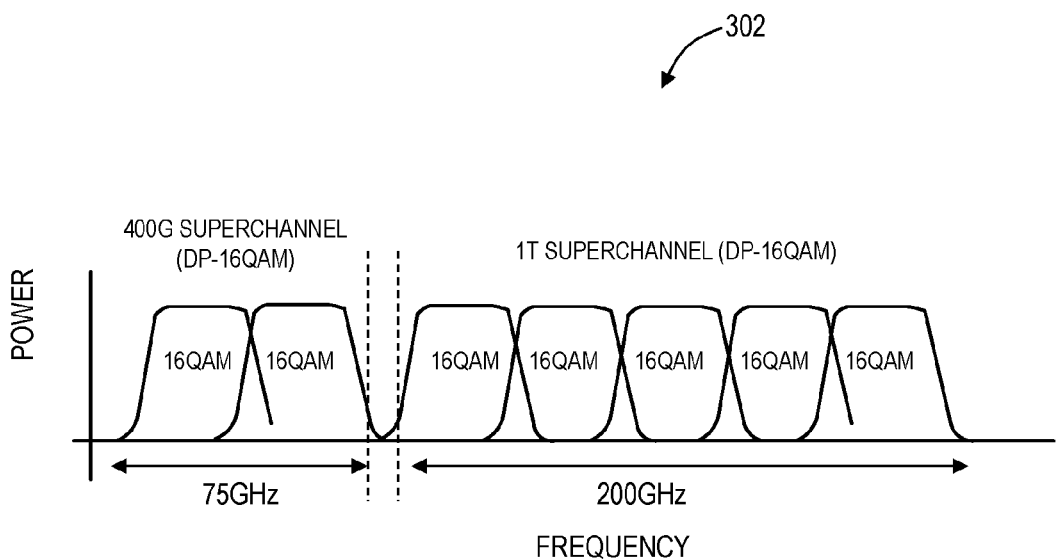
FIG. 6 is a spectrum plot of an OSA measurement for a flexible grid.

Referring to FIGS. 5 and 6, in an exemplary embodiment, spectrum plots illustrate OSA measurements 300, 302 for a fixed grid (FIG. 5) and a flexible grid (FIG. 6). The OSA measurements 300, 302 can be performed using the coherent optical receiver 52 and/or the method 100 as described herein. Again, the OSA measurements 300, 302 provide details of optical power as a function of frequency. Note, while FIGS. 5 and 6 separately show fixed grid and flexible grid, those of ordinary skill in the art will recognize implementations can include a combination of both. Again, in fixed grid, channels are evenly spaced apart in fixed chunks. In the flexible grid, channels can be combined into "super channels" and/or into variable width channels such as in 12.5 GHz increments. In both implementations, the OSA measurements 300, 302 can detect channels present, characteristics of the present channels, drift away from center frequencies, etc.

Exemplary Network Element

Figure 7:
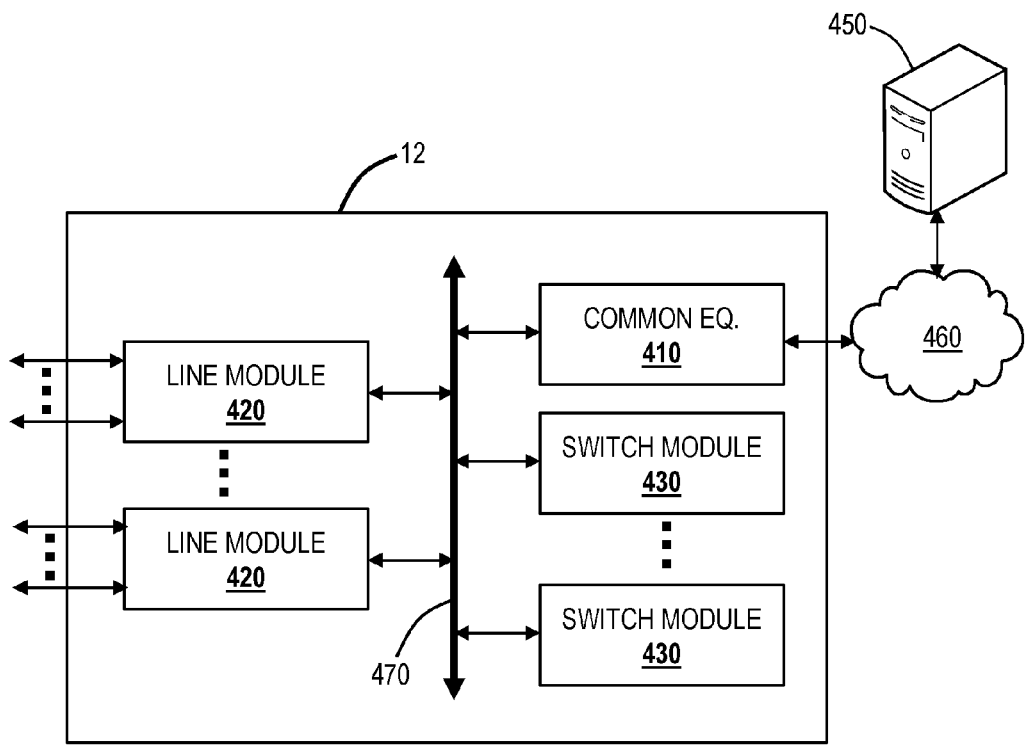
FIG. 7 is a block diagram of an exemplary network element for use with the methods and systems described herein.

Referring to FIG. 7, in an exemplary embodiment, a block diagram illustrates an exemplary network element 12 for use with the methods and systems described herein. In an exemplary embodiment, the exemplary network element 12 can be a network element that may consolidate the functionality of a multi-service provisioning platform (MSPP), digital cross-connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the network element 12 can be any of an OTN add/drop multiplexer (ADM), a SONET/SDH/OTN ADM, a multi-service provisioning platform (MSPP), a digital cross-connect (DCS), an optical cross-connect, an optical switch, a router, a switch, a wavelength division multiplexing (WDM) terminal, an access/aggregation device, etc. That is, the network element 12 can be any digital system with ingress and egress digital signals and switching therebetween of channels, timeslots, tributary units, wavelengths, etc. utilizing OTN, SONET, SDH, etc. Alternatively, the network element 12 can exclude digital switching and solely provide optical switching and/or transmission. While the network element 12 is generally shown as an optical network element, the systems and methods contemplated for use with any device supporting the coherent optical receiver 52 for data demodulation.

In an exemplary embodiment, the network element 12 includes common equipment 410, one or more line modules 420, and one or more switch modules 430. The common equipment 410 can include power; a control module; operations, administration, maintenance, and provisioning (OAM&P) access; user interface ports; and the like. The common equipment 410 can connect to a management system 450 through a data communication network 460. The management system 450 can include a network management system (NMS), element management system (EMS), an SDN controller, or the like. Additionally, the common equipment 410 can include a control plane processor configured to operate a control plane. The network element 12 can include an interface 470 for communicatively coupling the common equipment 410, the line modules 420, and the switch modules 430 together. For example, the interface 470 can be a backplane, midplane, a bus, optical or electrical connectors, or the like. The line modules 420 are configured to provide ingress and egress to the switch modules 430 and external to the network element 12. In an exemplary embodiment, the line modules 420 can form ingress and egress switches with the switch modules 430 as center stage switches for a three-stage switch, e.g. a three-stage Clos switch. Other configurations and/or architectures are also contemplated. The line modules 420 can include optical modems, such as the coherent optical transmitter 50 and the coherent optical receiver 52.

Further, the line modules 420 can include a plurality of optical modems per module and each module may include a flexible rate support for any type of connection, such as, for example, 155 Mbps, 622 Mbps, 1 Gbps, 2.5 Gbps, 10 Gbps, 40 Gbps, 100 Gbps, 400 Gbps, 1 Tbps, and any rate in between. Flexible Ethernet and Flexible OTN are being designed to accommodate variable payload capacities based on available spectrum and link budgets, and hence is well aligned with methods to more accurately measure the available spectrum. The line modules 420 can include wavelength division multiplexing interfaces, short reach interfaces, and the like, and can connect to other line modules 420 on remote network elements, end clients, edge routers, and the like. From a logical perspective, the line modules 420 provide ingress and egress ports to the network element 12, and each line module 420 can include one or more physical ports. As described herein the line modules 420 can support either fixed capacity channels or variable capacity channels. The line modules 420 can be transponders, muxponders, flexible optical modems, etc. Note, if the network element 12 is a DWDM terminal, the switch modules 430 may be omitted and the line modules 420 act as transponders, muxponders, etc. It is assumed that a switch device is at some point connected to the DWDM terminal to support the one or more logical interfaces that are formed from the excess capacity.

The switch modules 430 are configured to switch channels, timeslots, tributary units, etc. between the line modules 420. For example, the switch modules 430 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet packet granularity; and the like. Specifically, the switch modules 630 can include both Time Division Multiplexed (TDM) (i.e., circuit switching) and packet switching engines. The switch modules 430 can include redundancy as well, such as 1:1, 1:N, etc. In an exemplary embodiment, the switch modules 430 provide OTN, SONET, or SDH switching.

Those of ordinary skill in the art will recognize the network element 12 can include other components which are omitted for illustration purposes, and that the systems and methods described herein are contemplated for use with a plurality of different network elements with the network element 12 presented as an exemplary type of network element. For example, in another exemplary embodiment, the network element 12 may not include the switch modules 430, but rather have the corresponding functionality in the line modules 420 (or some equivalent) in a distributed fashion or completely omit the corresponding functionality as in the case of a DWDM terminal. For the network element 12, other architectures providing ingress, egress, and switching are also contemplated for the systems and methods described herein. In general, the systems and methods described herein contemplate use with any network element supporting the coherent optical receiver 52. Furthermore, the network element 12 is merely presented as one exemplary implementation for the systems and methods described herein.

Exemplary Controller

Figure 8:
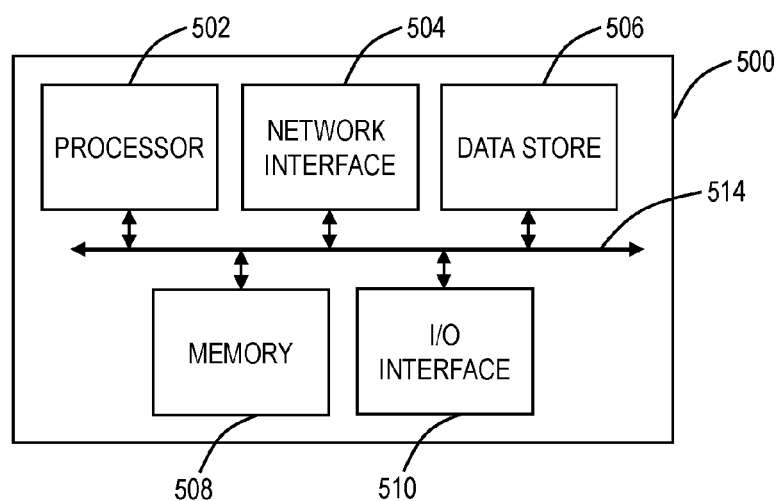
FIG. 8 is a block diagram illustrates a controller to provide control plane processing and/or operations, administration, maintenance, and provisioning (OAM&P) for the network element.

Referring to FIG. 8, in an exemplary embodiment, a block diagram illustrates a controller 500 to provide control plane processing and/or operations, administration, maintenance, and provisioning (OAM&P) for the network element 12. The controller 500 can be part of the common equipment, such as common equipment 410 in the network element 12. Also, the controller 500 can be the controller 120 in the coherent optical receiver 52. The controller 500 can include a processor 502 which is a hardware device for executing software instructions such as operating the control plane. The processor 502 can be any custom made or commercially available processor, a central processing unit (CPU), an auxiliary processor among several processors associated with the controller 500, a semiconductor-based microprocessor (in the form of a microchip or chip set), or generally any device for executing software instructions. When the controller 500 is in operation, the processor 502 is configured to execute software stored within the memory, to communicate data to and from the memory, and to generally control operations of the controller 500 pursuant to the software instructions. The controller 500 can also include a network interface 504, a data store 506, memory 508, an I/O interface 510, and the like, all of which are communicatively coupled together and with the processor 502.

The network interface 504 can be used to enable the controller 500 to communicate over a network, such as to communicate control plane information to other controllers, to the management system 460, to a Software Defined Networking or OpenFlow controller, and the like. The network interface 504 can include, for example, an Ethernet card (e.g., 10BaseT, Fast Ethernet, Gigabit Ethernet) or a wireless local area network (WLAN) card (e.g., 802.11a/b/g). The network interface 504 can include address, control, and/or data connections to enable appropriate communications on the network. The data store 506 can be used to store data, such as control plane information, provisioning data, OAM&P data, etc. The data store 506 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 506 can incorporate electronic, magnetic, optical, and/or other types of storage media. The memory 508 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 508 may incorporate electronic, magnetic, optical, and/or other types of storage media. Note that the memory 508 can have a distributed architecture, where various components are situated remotely from one another, but may be accessed by the processor 502.

The I/O interface 510 includes components for the controller 500 to communicate with other devices in a node, such as through the local interface 514. The components (502, 504, 506, 508, 510) are communicatively coupled via a local interface 514. The local interface 514 and the I/O interface 510 can be, for example, but not limited to, one or more buses or other wired or wireless connections, as is known in the art. The local interface 514 and the I/O interface 510 can have additional elements, which are omitted for simplicity, such as controllers, buffers (caches), drivers, repeaters, and receivers, among many others, to enable communications. Further, the local interface 514 and the I/O interface 510 can include address, control, and/or data connections to enable appropriate communications among the aforementioned components.

The network element 12, the controller 500, and associated optical networks and the like can utilize control plane systems and methods in addition to or in replace of the standard management system functionality. Control plane systems and methods provide an automatic allocation of network resources in an end-to-end manner. Exemplary control planes may include Automatically Switched Optical Network (ASON) as defined in G.8080/Y.1304, Architecture for the automatically switched optical network (ASON) (February 2005), the contents of which are herein incorporated by reference; Generalized Multi-Protocol Label Switching (GMPLS) Architecture as defined in Request for Comments (RFC): 3945 (October 2004) and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at multiple layers, and establishing connections. It is essential for the operation of control planes to have control plane signaling and Operations, Administration, Maintenance, and Provisioning (OAM&P) connectivity between nodes.

In an exemplary embodiment, the controller 120, 500 in the coherent optical receiver 52 is adapted to operate the coherent optical receiver 52 as an Optical Spectrum Analyzer (OSA). The controller includes the processor 502 and the memory 508 storing instructions that, when executed, cause the processor 502 to cause the local laser 112 in the coherent optical receiver 52 to sweep across a portion of optical spectrum to perform an OSA measurement while the coherent optical receiver 52 is not performing data demodulation, and receive an output from photodetector block 102 in the coherent optical receiver 52 and determining spectral components of an optical signal mixed with the local laser 112. The memory 502 storing instructions that, when executed, can further cause the processor 508 to lock the local laser to a predetermined center wavelength enabling recovery of an original digital signal from the optical signal while performing data demodulation. The memory 502 storing instructions that, when executed, can further cause the processor 508 to utilize the OSA measurement to detect automatically existing optical channels to determine available spectrum for use, and cause a corresponding coherent optical transmitter 50 to use a specific wavelength or spectrum based on the available spectrum. The memory 502 storing instructions that, when executed, can further cause the processor 508 to provide the OSA measurement to an external server including any of a Software Defined Networking (SDN) controller, a Network Management System (NMS), and an Element Management System (EMS).

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, the software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A coherent receiver adapted to operate as an Optical Spectrum Analyzer (OSA), the coherent receiver comprising:
   an optical front end adapted to receive an optical signal and to mix the optical signal with a local laser signal;
   a photodetector block coupled to the optical front end and adapted to receive an output of the optical front end and provide an output corresponding to spectral components of the optical signal; and
   a controller coupled to the optical front end and the photodetector block, wherein the controller is adapted to operate in an OSA mode to sweep the local laser signal across a portion of optical spectrum to perform an OSA measurement while not performing data demodulation, wherein the controller is adapted to provide the OSA measurement to one or more of a control plane and an external server comprising any of a Software Defined Networking (SDN) controller, a Network Management System (NMS), and an Element Management System (EMS).

2. The coherent receiver of claim 1, further comprising:
   a Digital Signal Processor (DSP) adapted to perform digital signal processing techniques to recover an original digital signal from the optical signal while performing the data demodulation.

3. The coherent receiver of claim 1, wherein the controller is adapted to utilize the OSA measurement to detect automatically existing optical channels to determine available spectrum for use and to cause a corresponding coherent transmitter to use a specific wavelength or spectrum based on the available spectrum.

4. The coherent receiver of claim 1, wherein the controller is adapted to utilize the OSA measurement to determine wavelength drift of optical channels in the optical signal.

5. The coherent receiver of claim 1, wherein the controller is adapted to utilize the OSA measurement to determine one or more of a modulation format and baud rate for a corresponding coherent transmitter.

6. The coherent receiver of claim 1, wherein the optical signal comprises a Wavelength Division Multiplex (WDM) signal with one or more of fixed grid channels and flexible grid channels, provided to the coherent receiver through one of a filtered implementation or filterless implementation.

7. The coherent receiver of claim 1, wherein the coherent receiver performs the OSA measurement in-skin without external test equipment.

8. A coherent receiver operation method to perform Optical Spectrum Analysis (OSA), the coherent receiver operation method comprising:
   receiving an optical signal;
   mixing the optical signal with a local laser signal, the local laser signal being swept across a portion of optical spectrum to perform an OSA measurement while not performing data demodulation;
   detecting via a photodetector block an output of the mixing corresponding to spectral components of the optical signal; and
   providing the OSA measurement to one or more of a control plane and an external server comprising any of a Software Defined Networking (SDN) controller, a Network Management System (NMS), and an Element Management System (EMS).

9. The method of claim 8, further comprising:
   performing digital signal processing techniques to recover an original digital signal from the optical signal while performing the data demodulation.

10. The method of claim 8, further comprising:
    utilizing the OSA measurement to detect automatically existing optical channels to determine available spectrum for use; and
    causing a corresponding coherent transmitter to use a specific wavelength or spectrum based on the available spectrum.

11. The method of claim 8, further comprising:
    utilizing the OSA measurement to determine wavelength drift of optical channels in the optical signal.

12. The method of claim 8, further comprising:
    utilizing the OSA measurement to determine one or more of a modulation format and baud rate for a corresponding coherent transmitter.

13. The method of claim 8, wherein the optical signal comprises a Wavelength Division Multiplex (WDM) signal with one or more of fixed grid channels and flexible grid channels, provided to the coherent receiver through one of a filtered implementation or filterless implementation.

14. The method of claim 8, further comprising:
    performing the OSA measurement in-skin without external test equipment.

15. A controller in a coherent receiver adapted to operate the coherent receiver as an Optical Spectrum Analyzer (OSA), the controller comprising:
    a processor; and
    memory storing instructions that, when executed, cause the processor to
      cause a local laser signal in the coherent receiver to sweep across a portion of optical spectrum to perform an OSA measurement while the coherent receiver is not performing data demodulation,
      receive an output from photodetector block in the coherent receiver and determine spectral components of an optical signal mixed with the local laser signal, and
      provide the OSA measurement to an external server comprising any of a Software Defined Networking (SDN) controller, a Network Management System (NMS), and an Element Management System (EMS).

16. The controller of claim 15, wherein the memory storing instructions that, when executed, further cause the processor to
    lock the local laser signal to a predetermined center wavelength enabling recovery of an original digital signal from the optical signal while performing the data demodulation.

17. The controller of claim 15, wherein the memory storing instructions that, when executed, further cause the processor to
    utilize the OSA measurement to automatically detect existing optical channels to determine available spectrum for use, and
    cause a corresponding coherent transmitter to use a specific wavelength or spectrum based on the available spectrum.

* * * * *